United States Patent
Enderle et al.

(10) Patent No.: US 8,024,062 B2
(45) Date of Patent: Sep. 20, 2011

(54) METHOD AND APPARATUS TO INVENTORY PORTABLE DATA STORAGE CARTRIDGES DISPOSED IN A STORAGE LIBRARY

(75) Inventors: Becky Christine Enderle, Tucson, AZ (US); David Alan Brettell, Vail, AZ (US)

(73) Assignee: International Business Machines Corporation, Armonk, NY (US)

( * ) Notice: Subject to any disclaimer, the term of this patent is extended or adjusted under 35 U.S.C. 154(b) by 640 days.

(21) Appl. No.: 12/134,100

(22) Filed: Jun. 5, 2008

(65) Prior Publication Data

US 2009/0301978 A1 Dec. 10, 2009

(51) Int. Cl.
*G06F 7/00* (2006.01)
*G06F 17/00* (2006.01)
*G06F 19/00* (2011.01)
*B65G 65/34* (2006.01)
*G06K 9/00* (2006.01)

(52) U.S. Cl. ........ 700/215; 700/214; 700/218; 700/259; 700/231; 382/153; 414/274

(58) Field of Classification Search ........................ None
See application file for complete search history.

(56) References Cited

U.S. PATENT DOCUMENTS

| | | | |
|---|---|---|---|
| 6,574,529 B1 * | 6/2003 | Lundeen et al. | 700/218 |
| 6,684,126 B2 * | 1/2004 | Omura et al. | 700/231 |
| 2007/0110297 A1 * | 5/2007 | Pierce | 382/153 |

* cited by examiner

*Primary Examiner* — Gene Crawford
*Assistant Examiner* — Yolanda Cumbess
(74) *Attorney, Agent, or Firm* — Dale F. Regelman; Quarles & Brady LLP (57) ABSTRACT

A portable data storage cartridge, comprising a housing and a data storage medium disposed within the housing. The portable data storage cartridge further comprises a first label reciting an identifier disposed on a front portion of the housing, and a second label displaying said identifier at one or more places disposed on a side portion of said housing. A plurality of portable data storage cartridges can be disposed in a storage slot dimensioned to accommodate (N) portable data storage cartridges in a row. The storage slot is formed to include (N−1) visualization apertures extending through a side. In addition, the storage slot further comprises (N−1) reflective members, where each reflective member comprises a first end attached to the side with a second end extending outwardly from that side.

18 Claims, 12 Drawing Sheets

FIG. 8

METHOD AND APPARATUS TO INVENTORY PORTABLE DATA STORAGE CARTRIDGES DISPOSED IN A STORAGE LIBRARY

FIELD OF THE INVENTION

The present invention relates to an apparatus and method to inventory portable data storage cartridges disposed in a storage library.

BACKGROUND OF THE INVENTION

Automated media storage libraries are known for providing cost effective access to large quantities of stored media. Generally, media storage libraries include a large number of storage slots on which are stored portable data storage cartridges. A data storage medium is removeably disposed within the portable data storage cartridge. Such data storage media include, for example, magnetic storage media, optical storage media, electronic storage media, and holographic storage media. One (or more accessors retrieve the portable data storage cartridges from the storage slots, and transport the accessed media to an information storage device for reading and/or writing data on the data storage medium disposed therein. Suitable electronics both operate the accessor and operate the information storage devices to transmit and/or receive data from an attached on-line host computer.

In a conventional automated media storage library, the storage slots are arranged in a planar orthogonal arrangement forming a "wall" of storage slots for holding information storage media. The plane may be a flat plane, or may be a cylindrical plane. To double the storage capacity, two "walls" of storage slots may be provided on either side of the accessor.

SUMMARY OF THE INVENTION

Applicants' invention comprises a portable data storage cartridge comprising a housing and a data storage medium disposed within that housing. The portable data storage cartridge further comprises a first label reciting an identifier disposed on a front portion of the housing, and a second label disposed on a side portion of the housing, where that second label displays the identifier at two or more locations.

Applicants' invention further comprises a storage slot dimensioned to accommodate (N) portable data storage cartridges in a row, where (N) is greater than or equal to 2. Applicants' storage slot is formed to include (N−1) visualization apertures extending through a first side. In addition, Applicants' storage slot further comprises (N−1) reflective members, where each reflective member comprises a first end attached to the first side with a second end extending outwardly from that first side.

Applicants' invention further comprises a storage library comprising a plurality of Applicants' portable data storage cartridges and at least one of Applicants' storage slots. Applicants' invention further comprises a method inventory a plurality of portable data storage cartridges disposed within Applicants' storage library.

BRIEF DESCRIPTION OF THE DRAWINGS

The invention will be better understood from a reading of the following detailed description taken in conjunction with the drawings in which like reference designators are used to designate like elements, and in which.

DETAILED DESCRIPTION OF THE PREFERRED EMBODIMENTS

This invention is described in preferred embodiments in the following description with reference to the Figures, in which like numbers represent the same or similar elements. Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

The described features, structures, or characteristics of the invention may be combined in any suitable manner in one or more embodiments. In the following description, numerous specific details are recited to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

Figure 1:
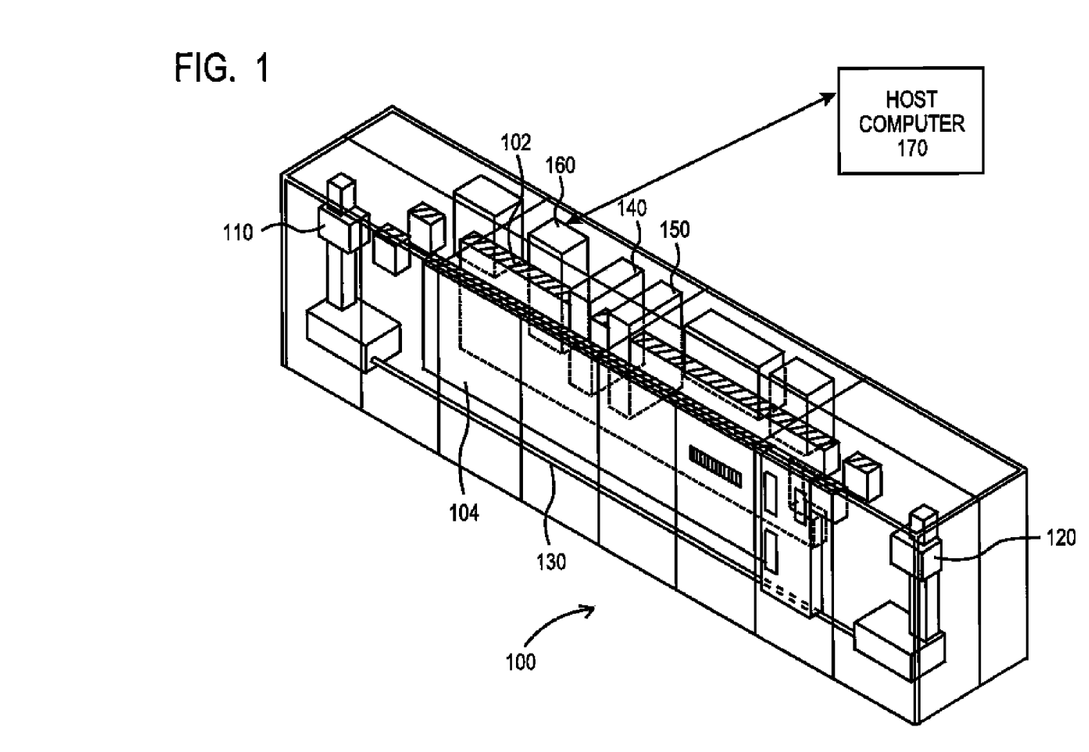
FIG. 1 is a perspective view of one embodiment of Applicants' storage library.

Referring to FIG. 1, Applicants' data storage library 100 is shown having a first wall of storage slots 102 and a second wall of storage slots 104. Portable data storage cartridges are individually stored in these storage slots. Each such portable data storage cartridge comprises a housing, a data storage medium disposed within that housing, a first label reciting an identifier on a front portion of the housing, and a second label disposed on a side of the housing, where that second label recites the same identifier at two or more places.

Applicants' storage library further comprises one or more accessors, such as accessors 110 and 120. An accessor is a robotic device which can retrieve and transport, among other things, Applicants' portable data storage cartridges removeably disposed in Applicants' storage slots 102 or 104. The accessor delivers the retrieved portable data storage cartridge to a data drive 140 or 150 for reading and/or writing data to the data storage medium disposed herein, and returns the portable data storage cartridge to a proper storage slot. As shown in FIG. 1, accessors 110 and 120 travel bi-directionally along rail 170 in an aisle disposed between first wall of storage slots 102 and second wall of storage slots 104. U.S. Pat. No. 6,038,490, entitled "Automated Data Storage Dual Picker Interference Avoidance," teaches a method to prevent collisions occurring between accessors moveably disposed on the same rail system, and is hereby incorporated by reference herein.

In the illustrated embodiment of FIG. 1, library controller 160 is in communication with host computer 170. As a general matter, host computer 170 comprises a computing device, such as a mainframe, personal computer, workstation, and combinations thereof, including an operating system, such as and without limitation, Windows, AIX, Unix, MVS, LINUX, etc. (Windows is a registered trademark of Microsoft Corporation; AIX is a registered trademark and MVS is a trademark of IBM Corporation; UNIX is a registered trademark in the United States and other countries licensed exclusively through The Open Group; and LINUX is a registered trademark of Linus Torvald). In certain embodiments, host computer 100 further comprises a storage management program. In certain embodiments, that storage management program may include the functionality of storage management type programs known in the art that manage the transfer of data to and from a storage library, such as for example and without limitation the IBM DFSMS implemented in the IBM MVS operating system.

Figure 2:
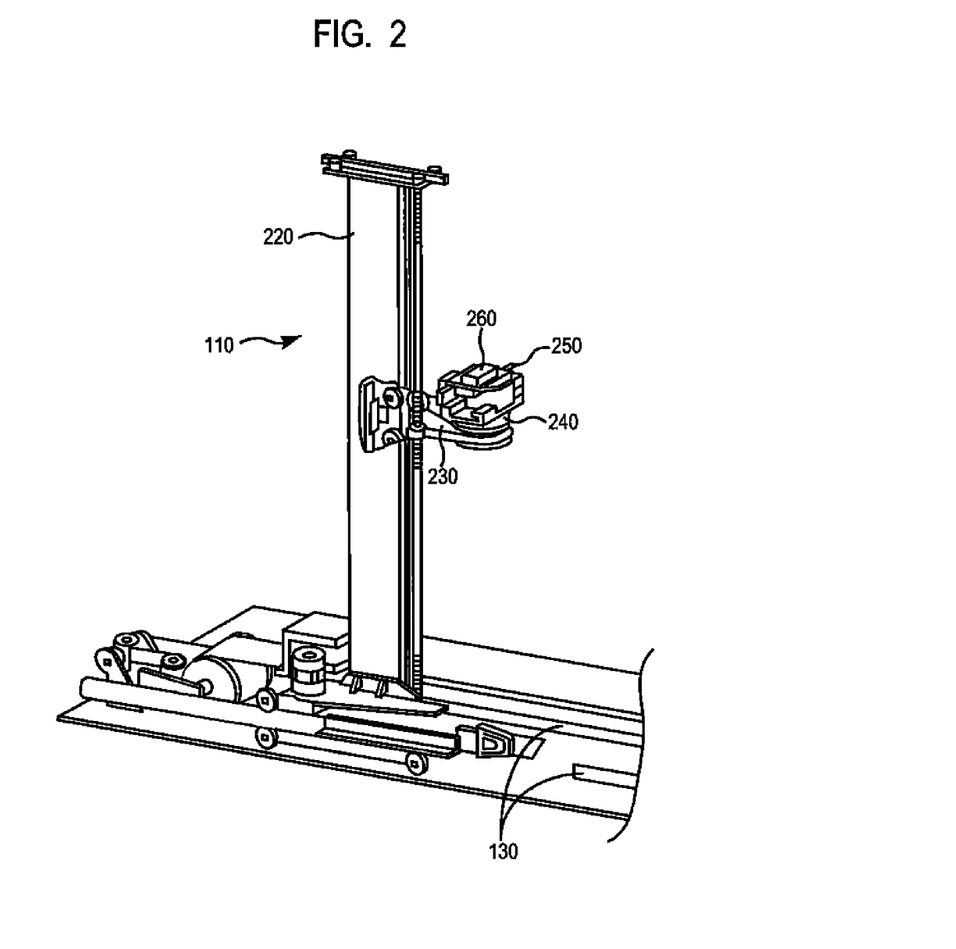
FIG. 2 is a perspective view of one embodiment of Applicants' accessor.

Referring to FIG. 2, accessor 110 travels bi-directionally along rail system 130. In the embodiment shown in FIG. 2, rail system 130 comprises one or more rails. Accessor 110 includes vertical pillar 220. Lifting servo section 230 moves vertically along pillar 220. In the two gripper embodiment shown in FIG. 2, accessor 110 includes first gripper 240 and second gripper 250 disposed on lifting servo section 230. Accessor 110 further comprises bar code reader 260 disposed on lifting servo section 230. In other embodiments of Applicants' invention comprises a storage library comprising accessors that comprise a single gripper.

In the illustrated embodiment of FIG. 2, accessor 110 rotates such that one gripper can access a data storage medium from, for example, first wall of storage slots 102 (FIG. 1), and then rotate to deliver that accessed medium to data drive 240 or 250 FIG. 1). Therefore, accessor 110 includes a first gripper motor to actuate the gripping action of first gripper 240, a second gripper motor to actuate the gripping action of second gripper 250, and a pivot motor to effectuate rotation.

Figure 3A:
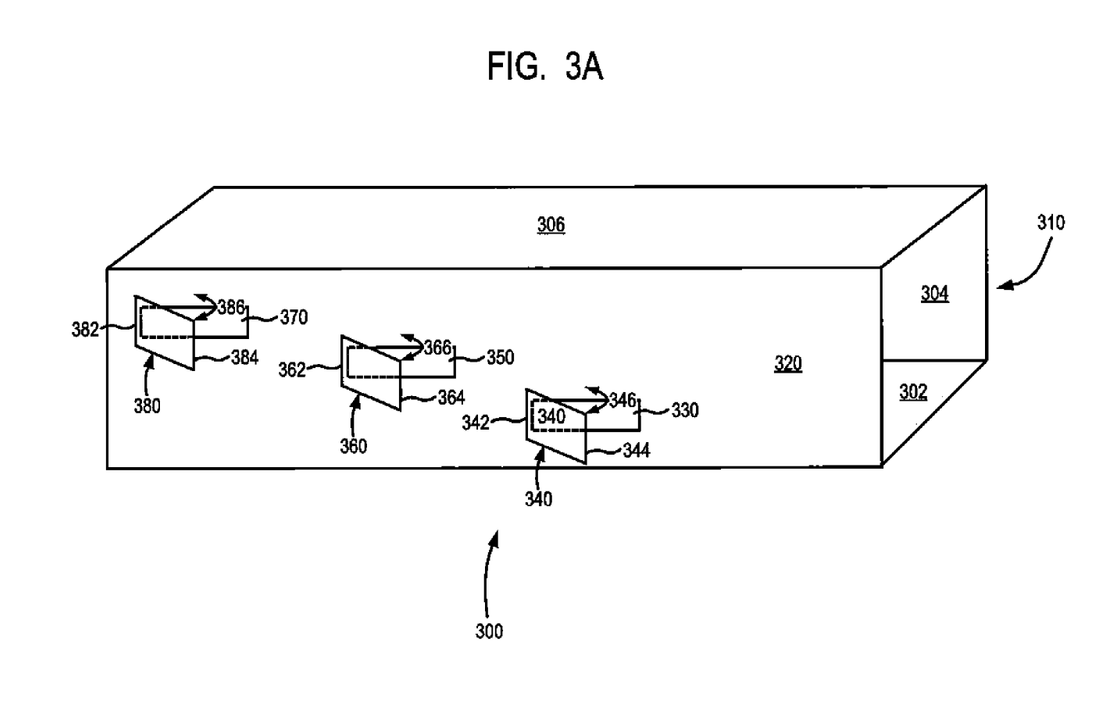
FIG. 3A is perspective view of one embodiment of Applicants' storage slot.
Figure 3B:
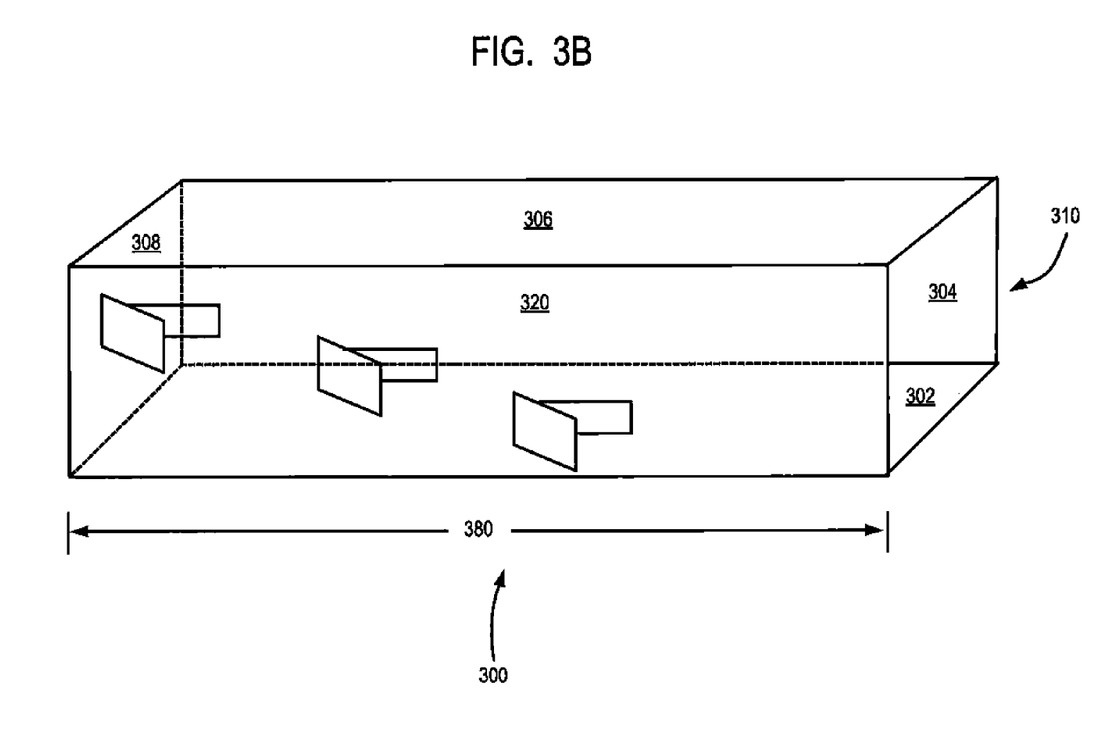
FIG. 3B is a second perspective view of the storage slot of FIG. 3A.

In the illustrated embodiment of FIG. 3A and 3B, storage slot 300 comprises a bottom 302, an open end 310, a first side 320, a second side 304, a top 306, an end member 308, and a depth 380. Further in the illustrated embodiment of FIGS. 3A and 3B, side 320 is formed to include visualization apertures 330, 350, and 370, extending therethrough. Further in the illustrated embodiment of FIGS. 3A and 3B, reflective members 340, 360, and 380, comprise a first end 342, 362, and 382, respectively, attached to side 320 of storage slot 300. Reflective members 340, 360, and 380, further comprise a second end 344, 364, and 384, that extends outwardly from side 320. In the illustrated embodiment of FIGS. 3A and 3B, reflective members 340, 360, and 380, in combination with side 320 define dihedral angles 346, 366, and 386, respectively, wherein those dihedral angles 346, 366, and 386, are less than ninety degrees (90°).

Figure 3C:
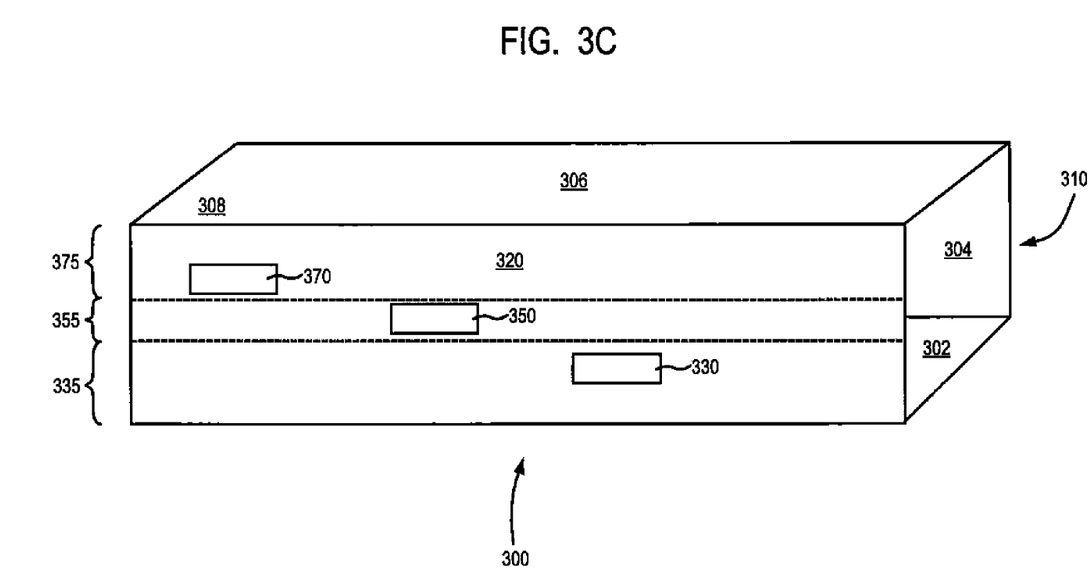
FIG. 3C is a third perspective view of the storage slot of FIG. 3A.

In FIG. 3C, reflective members 340, 360, and 380, are not shown for clarity. In the illustrated embodiment of FIG. 3C, side 320 is formed to include first visualization aperture 330 extending through a first portion 335 of side 320. In the illustrated embodiment of FIG. 3C, side 320 is further formed to include second visualization aperture 350 extending through a second portion 355 of side 320, wherein second portion 355 is disposed above first portion 335. In the illustrated embodiment of FIG. 3C, side 320 is further formed to include third visualization aperture 370 extending through a third portion 375 of side 320, wherein third portion 375 is disposed above second portion 355.

In addition, in the illustrated embodiments of FIGS. 3A, 3B, and 3C, first end 342 of first reflective member 340 is attached to first portion 335 of side 320. Second end 362 of second reflective member 360 is attached to second portion 355 of side 320. First end 382 of third reflective member 380 is attached to third portion 375 of side 320.

Figure 3D:
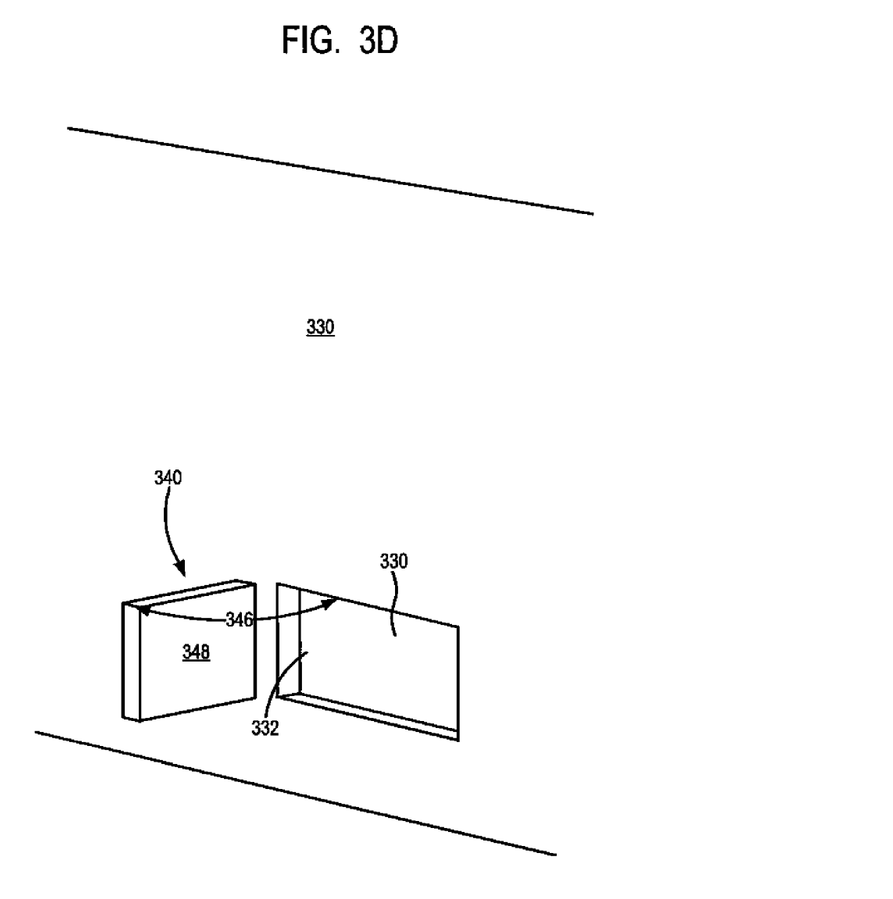
FIG. 3D shows in greater detail a reflective member element of the storage slot of FIG. 3A.

FIG. 3D shows a portion of side 330 which is formed to include visualization aperture 330, wherein reflective member 340 is attached to side 330 adjacent distal end 332 of visualization aperture 330. In the illustrated embodiment of FIG. 3D, reflective member 340 comprises a reflective surface 348, wherein reflective surface 348 has a facing relationship with visualization aperture 330. In certain embodiments, reflective surface 348 comprises a glass mirror. In certain embodiments, reflective surface 348 comprises polished metal.

Figure 4:
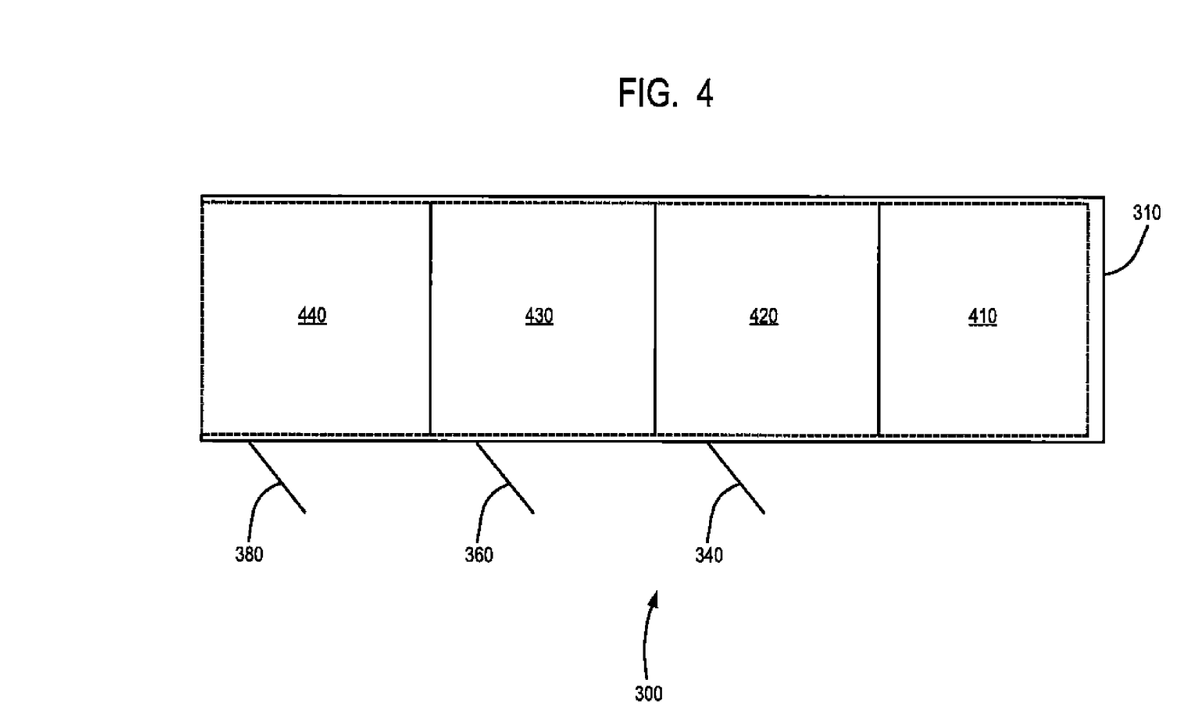
FIG. 4 is a top view of the storage slot of FIG. 3A showing four portable data storage cartridges disposed therein.

Referring now to FIGS. 3A and 4, depth 380 (FIG. 3A) of Applicants' storage slot 300 is adjusted to be substantially equal to (N) lengths of Applicants' portable data storage cartridge. By "substantially equal to", Applicants mean equal to within about plus or minus ten percent (10%). FIG. 4 shows four portable data storage cartridges, namely portable data storage cartridges 410, 420, 430, and 440, disposed in a row within storage slot 300.

As a general matter, Applicants' storage slot is dimensioned to accept (N) portable data storage cartridges, and Applicants' storage slot is formed to include (N−1) visualization apertures extending through side 320 (FIGS. 3A, 3B, 3C), and Applicants' storage slot comprises (N−1) reflective members disposed on side 320. For example, in the illustrated embodiment of FIGS. 3A, 3B, 3C, and 4, Applicants' storage slot 300 is designed to accommodate four portable data storage cartridges, and comprises three reflective members, and is formed to include three visualization apertures extending therethrough Referring now to FIGS. 5A and 5B, Applicants' portable data storage cartridge 500 comprises housing 502 and data storage medium 570 disposed within housing 502. Portable data storage cartridge 500 further comprises front 510, side 540, side 560, back 570, bottom 580, and top 550. In the illustrated embodiment of FIG. 5A, label 520 is disposed on front 510. Label 520 recites identifier 530$a$. In the illustrated embodiment of FIG. 5A, identifier 530$a$ comprises a bar code.

Figure 5A:
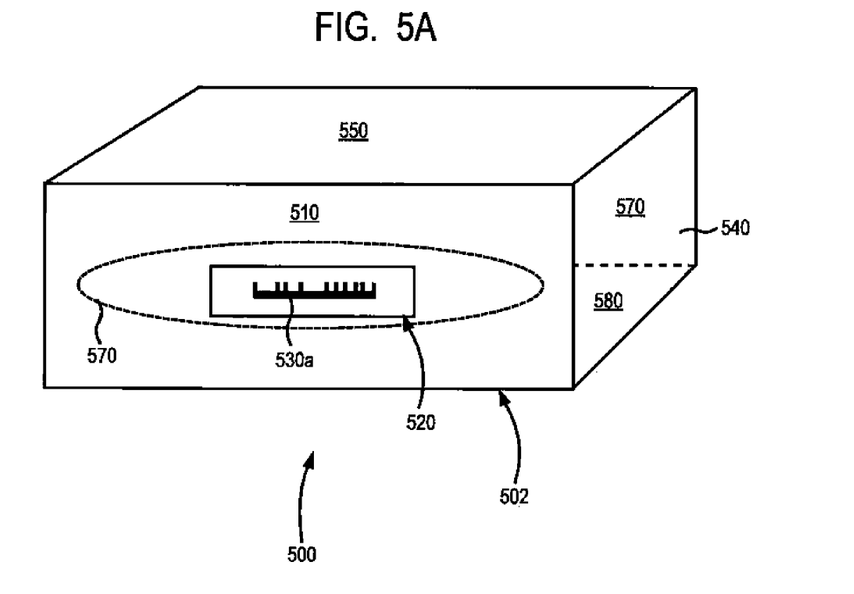
FIG. 5A is a first perspective view of one embodiment of Applicants' portable data storage cartridge.
Figure 5B:
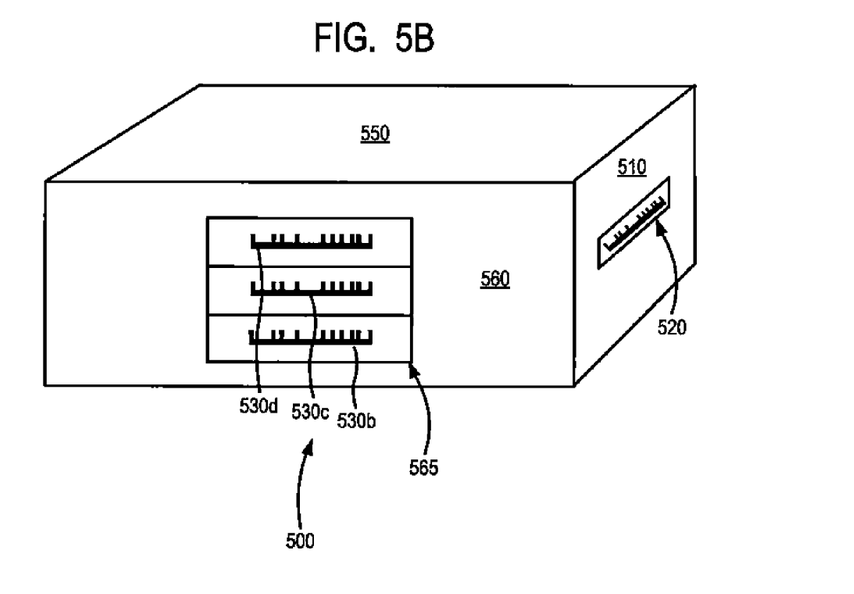
FIG. 5B is a second perspective view of the portable data storage cartridge of FIG. 5A.

In the illustrated embodiment of FIG. 5B, portable data storage cartridge 500 further comprises label 565 disposed on side 560. Label 565 recites identifiers 530$b$, 530$c$, and 530$d$, wherein identifiers 530$a$, 530$b$, 530$c$, and 530$d$, are the same. As a general matter, Applicants' second label, such as label 565, comprises an "identifier stack," wherein the same identifier is displayed (N) times, and wherein a (j+1)th display of the identifier is disposed above a (j)th display of that same identifier on the second label, wherein (j) is greater than or equal to 1 and less than or equal to (N−1). If Applicants' portable data storage cartridge is utilized in a data storage and retrieval system comprising a storage slot designed to accommodate (N) portable data storage cartridges, then label 565 recites the same identifier at (N−1) different places.

In the illustrated embodiment of FIG. 5B, (N) is 3. Using the portable data storage cartridge embodiment of FIG. 5B, a (j)th label display is reflected by a (j)th reflective member disposed on the side of Applicants' storage slot 300.

Figure 5C:
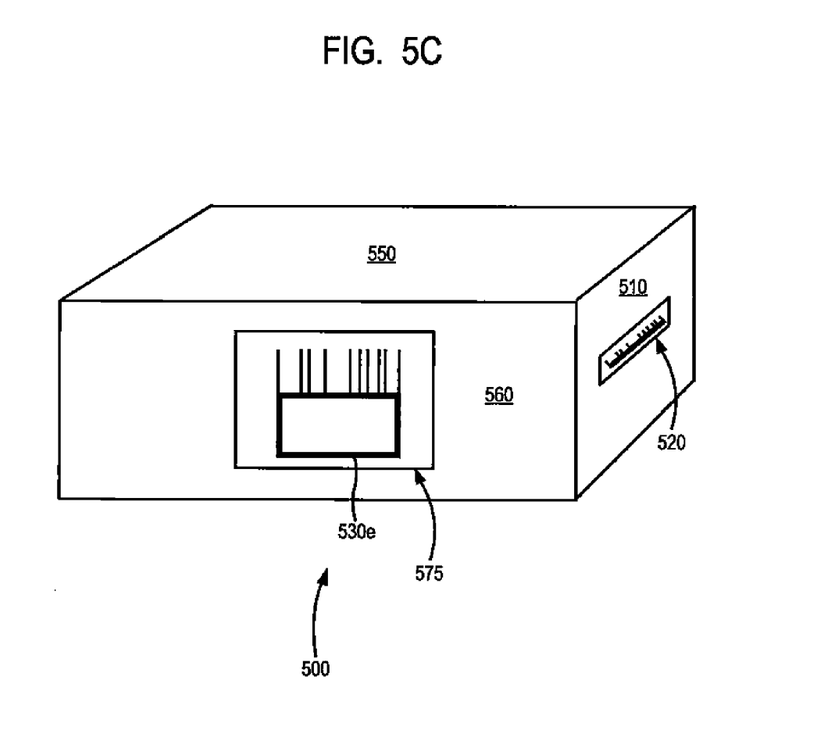
FIG. 5C illustrates a second embodiment of Applicants' portable data storage cartridge, wherein this second embodiment comprises a side label displaying a single, enlarged identifier.

In the illustrated embodiment of FIG. 5C, portable data storage cartridge 500 comprises label 575 disposed on side 560, wherein label 575 displays a single, enlarged identifier 530e. Using the portable data storage cartridge embodiment of FIG. 5C, the enlarged label display 530e is reflected by each of the (N) reflective members disposed on the side of Applicants' storage slot 300.

The illustrated embodiment of Applicants' portable data storage cartridge of FIGS. 5A, 5B, and 5C, should not be taken as limiting. The illustrated embodiments of FIGS. 5A, 5B, and 5C, comprise two exemplary embodiments. As a general matter, Applicants' portable data storage cartridge may comprise a variety of shapes and form factors, wherein each such embodiment comprises a label 520 disposed on a front portion, and a label 565 or a label 575 is disposed on a side portion.

Figure 6:
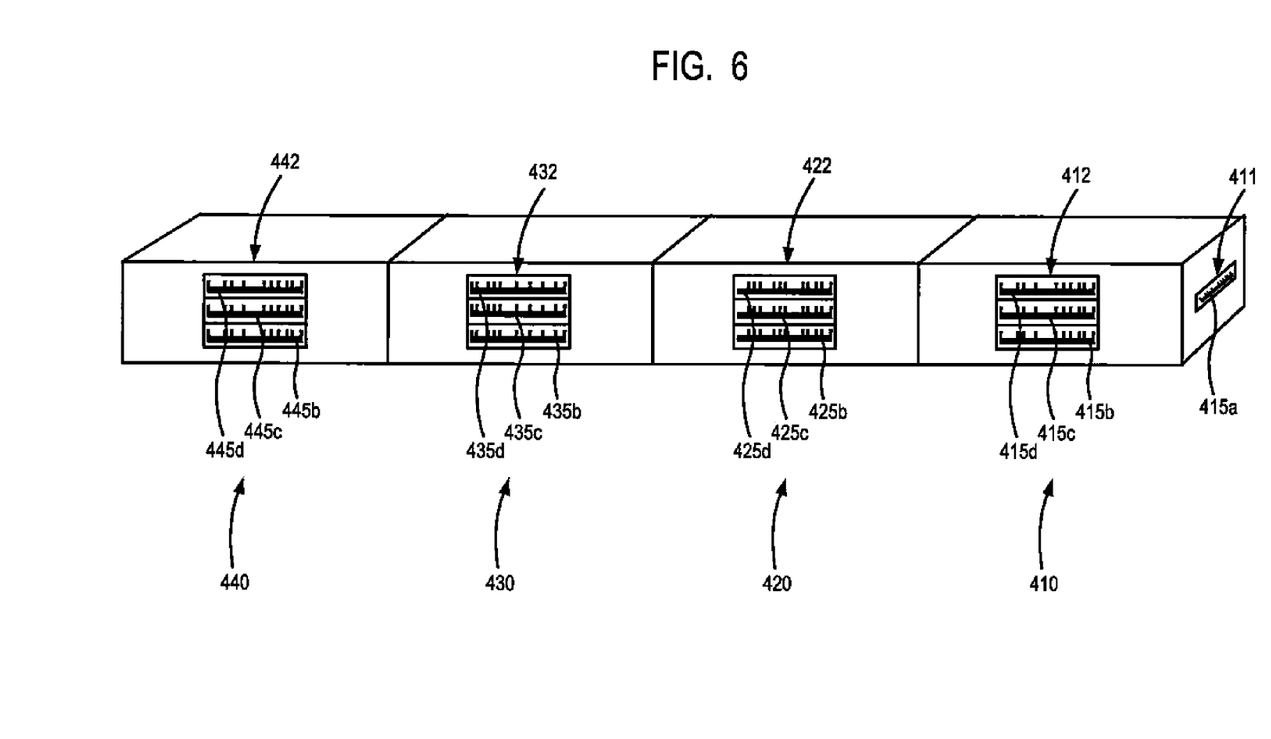
FIG. 6 is a perspective view showing the four portable data storage cartridges of FIG. 4.

Referring now to FIGS. 4 and 6, FIG. 4 shows portable data storage cartridges 410, 420, 430, and 440, disposed within Applicants' storage slot 300. FIG. 6 is a perspective view of those portable data storage cartridges as arranged within storage slot 300 in FIG. 4. In the illustrated embodiment of FIG. 6, each portable data storage cartridge displays a unique identifier at four different places.

Front label 411 disposed on portable data storage cartridge 410 recites bar code identifier 415a. Side label 412 disposed on portable data storage cartridge 410 recites bar code identifier 415b, 415c, and 415d, wherein bar code identifiers 415a, 415b, 415c, and 415d, comprise the same bar code.

Side label 422 disposed on portable data storage cartridge 420 recites bar code identifier 425b, 425c, and 425d, wherein bar code identifiers 425b, 425c, and 425d, comprise the same bar code. As those skilled in the art will appreciate, a front label disposed on portable data storage cartridge 420, and the bar code identifier recited by that front label cannot be seen in the illustrated embodiment of FIG. 6.

Side label 432 disposed on portable data storage cartridge 430 recites bar code identifier 435b, 435c, and 435d, wherein bar code identifiers 435b, 435c, and 435d, comprise the same bar code. As those skilled in the art will appreciate, a front label disposed on portable data storage cartridge 430, and the bar code identifier recited by that front label cannot be seen in the illustrated embodiment of FIG. 6.

Side label 442 disposed on portable data storage cartridge 440 recites bar code identifier 445b, 445c, and 445d, wherein bar code identifiers 445b, 445c, and 445d, comprise the same bar code. As those skilled in the art will appreciate, a front label disposed on portable data storage cartridge 440, and the bar code identifier recited by that front label cannot be seen in the illustrated embodiment of FIG. 6.

Figure 7:
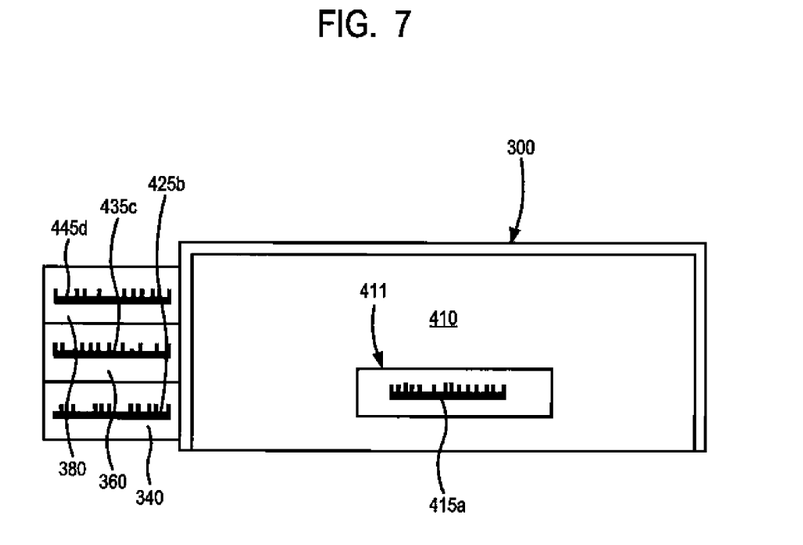
FIG. 7 is a front view of the storage slot of FIGS. 3A, 3B, 3C, and 4, with the four portable data storage cartridges of FIG. 6 disposed therein.

FIG. 7 illustrates a front view of Applicants' storage slot 300, and shows front label 411 reciting bar code identifier 415a, wherein label 411 is visible through open end 310 (FIG. 3A, 4). FIG. 7 further shows that an image of bar code label 425b, recited on label 422 (FIG. 6), is projected through visualization aperture 330 (FIGS. 3A, 3C, 3D) and onto reflective member 340.

FIG. 7 further shows that an image of bar code label 435c, recited on label 432 (FIG. 6), is projected through visualization aperture 350 (FIGS. 3A, 3C, 3D) and onto reflective member 360. FIG. 7 further shows that an image of bar code label 445d, recited on label 442 (FIG. 6), is projected trough visualization aperture 370 (FIGS. 3A, 3C, 3D) and onto reflective member 380.

In the illustrated embodiment of FIGS. 4, 6, and 7, when four of Applicants' portable data storage cartridges are disposed within Applicants' storage slot 300, then a different bar code identifier assigned to each of those four portable data storage cartridges can be seen from a front view of Applicants' storage slot. In addition, an accessor, such as accessor 110 (FIGS. 1, 2), and a lifting servo section comprising a bar code reader, such as lifting servo section 230 (FIG. 2) and bar code reader 260 (FIG. 2), can be positioned such that the bar code reader can read front label 415a recited on a label disposed on a front portion of a portable data storage cartridge disposed nearest open end 310 of storage slot 300. In addition, an accessor, such as accessor 110 (FIGS. 1, 2), and a lifting servo section comprising a bar code reader, such as lifting servo section 230 (FIG. 2) and bar code reader 260 (FIG. 2), can be further positioned such that the bar code reader can read bar code image 425b reflected by reflective member 340, and bar code image 435c reflected by reflective member 360, and bar code image 445d reflected by reflective member 380.

Figure 8:
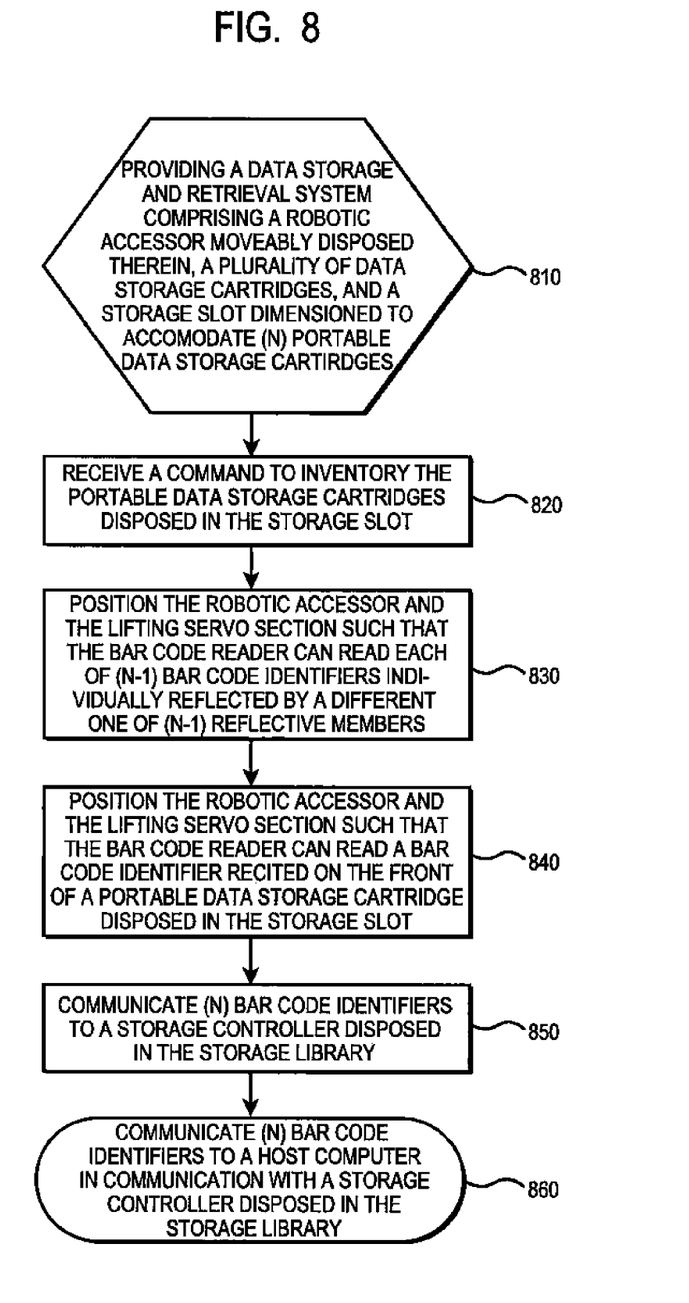
FIG. 8 is a flow chart summarizing the steps of Applicants' method.

Applicant's invention comprises a method to inventory a plurality of Applicants' portable data cartridge disposed in Applicants' storage library. FIG. 8 summarizes the steps of Applicants' method. Referring now to FIG. 8, in step 810 the method provides Applicants' storage library which comprises a robotic accessor, such as for example accessor 110 (FIGS. 1, 2), a plurality of Applicants' data storage cartridges 500, and at least one of Applicants' storage slot 300 dimensioned to accommodate (N) portable data storage cartridges therein.

In step 820, the method receives a command to inventory the portable data storage cartridges disposed in the storage slot. In certain embodiments, the command of step 820 is provided by a host computer in communication with Applicants' storage library.

In step 830, the method positions the robotic accessor and the lifting servo section with respect to the storage slot such that the bar code reader disposed on the lifting servo section can read (N−1) bar code identifiers, such as bar code identifiers 425b (FIGS. 6, 7) and 435c (FIGS. 6, 7) and 445d (FIGS. 6, 7), individually reflected by a different one of (N−1) reflective members, such as reflective members 340 FIGS. 3A, 4, 7), 360 (FIGS. 3A, 4, 7), and 380 (FIGS. 3A, 4, 7), respectively, disposed on a side of Applicants' storage slot.

In step 840, the method positions the robotic accessor, and positions the lifting servo section, such that the bar code reader can read a bar code identifier recited on a front portion of a first one of (N) portable data storage cartridges, such as for example bar code identifier 415a (FIGS. 6, 7) recited on label 411 (FIGS. 6, 7) disposed on the front of portable data storage cartridge 410 (FIGS. 4, 6, 7) disposed within said storage slot.

In step 850, the method communicates (N) bar code identifiers to a storage controller, such as storage controller 160 (FIG. 1), disposed in the storage library. In step 860, the method communicates (N) bar code identifiers to a host computer, such as host computer 170 (FIG. 1), in communication with a storage controller disposed in the storage library In certain embodiments, individual steps recited in FIG. 8, may be combined, eliminated, or reordered.

In certain embodiments, Applicants' invention includes instructions, such as instructions encoded in a computer readable medium, wherein those instructions are executed by a processor disposed in Applicants' storage library to perform one or more of steps 820, 830, 840, and/or 850, recited in FIG. 8.

In other embodiments, Applicants' invention includes instructions residing in any other computer program product, where those instructions are executed by a computer external to, or internal to, storage library 100, to perform one or more of steps 820, 830, 840, and/or 850, recited in FIG. 8. In either case, the instructions may be encoded in an information storage medium comprising, for example, a magnetic information storage medium, an optical information storage medium, an electronic information storage medium, and the like. By "electronic storage media," Applicants mean, for example and without limitation, one or more devices, such as and without limitation, a PROM, EPROM, EEPROM, Flash PROM, compactflash, smartmedia, and the like.

While the preferred embodiments of the present invention have been illustrated in detail, it should be apparent that modifications and adaptations to those embodiments may occur to one skilled in the art without departing from the scope of the present invention as set forth in the following claims.

We claim:

1. A storage library, comprising:
   a storage slot comprising a bottom and a side attached to said bottom and extending upwardly therefrom;
   at least one reflective member comprising a first end attached to said side and an opposing second end extending outwardly therefrom;
   wherein said side is formed to include at least one visualization aperture extending therethrough, and wherein said first end of said reflective member is attached to said first side adjacent said visualization aperture;
   a portable data storage cartridge comprising:
   a housing comprising a data storage medium disposed within therein;
   a first label reciting an identifier disposed on a front portion of said housing;
   a second label disposed on a side portion of said housing, wherein said second label displays said identifier at one or more locations;
   wherein said storage slot further comprises an end member attached to a distal end of said side and a distal end of said bottom, and an open end defined by a proximal end of said side and a proximal end of said bottom;
   wherein when said portable data storage cartridge is disposed in said storage slot such that said housing contacts said end member, an image comprising all or a portion of said second label is reflected by said reflective member.

2. The storage library of claim 1, wherein said data storage medium is selected from the group consisting of a magnetic data storage medium, an optical data storage medium, an electronic data storage medium, and a holographic data storage medium.

3. The storage library of claim 1, further comprising:
   a plurality of portable data storage cartridges, wherein each of said plurality of portable data storage cartridges comprises a housing and a data storage medium disposed within said housing, a first label reciting an identifier disposed on a front portion of said housing, and a second label disposed on a side portion of said housing, wherein said second label displays said identifier at two or more locations;
   wherein said storage slot is dimensioned to accommodate (N) portable data storage cartridges, said storage slot further comprising:
   a depth comprising the distance between said open end and said end member, wherein said depth substantially equals the multiplication product of (N) and said length, wherein (N) is greater than or equal to 2;
   (N−1) reflective members each comprising a first end attached to said first side of said storage slot, and an opposing second end extending outwardly therefrom;
   wherein said side is formed to include (N−1) visualization apertures extending therethrough.

4. The storage library of claim 3, wherein a second label disposed on each of said (N) portable data storage cartridges displays an identifier unique to that portable data storage cartridge at (N−1) different locations.

5. The storage library of claim 4, wherein a (k+1)th display of said identifier on each second label is disposed above a (k)th display of said identifier on that second label, wherein (k) is greater than or equal to 1 and less than or equal to (N−2).

6. The storage library of claim 4, wherein:
   the first end of a (k)th reflective member is a attached to a (k)th portion of said side of storage slot;
   the first end of an (k+1)th reflective member is attached to an (k+1)th portion of said side of said storage slot, wherein said (k+1)th portion of said side is disposed above said (k)th portion of said side.

7. The storage library of claim 6, further comprising a plurality of storage slots, wherein each of said plurality of storage slots comprises:
   a bottom;
   a side attached to said bottom and extending upwardly therefrom;
   an end member attached to a distal end of said side and a distal end of said bottom;
   an open end defined by a proximal end of said side and a proximal end of said bottom;
   a depth comprising the distance between said open end and said end member, wherein said depth substantially equals the multiplication product of (N) and said length, wherein (N) is greater than or equal to 2;
   (N−1) reflective members each comprising a first end attached to said first side of said storage slot, and an opposing second end extending outwardly therefrom;
   wherein said first side is formed to include (N−1) visualization apertures extending therethrough.

8. A portable data storage cartridge, comprising:
   a housing comprising a front and a side;
   a data storage medium disposed within said housing;
   a first label reciting an identifier disposed on said front;
   a second label disposed on said side, wherein said second label displays said identifier at two or more places;
   wherein said second label comprises an identifier stack displaying the same identifier (N) times, wherein (N) is greater than or equal to 2.

9. The portable data storage cartridge of claim 8, wherein a (j+1)th display of said identifier on said second label is disposed above a (j)th display of said identifier on said label, wherein (j) is greater than or equal to 1 and less than or equal to (N−1).

10. The portable data storage cartridge of claim 8, wherein said data storage medium is selected from the group consisting of a magnetic data storage medium, an optical data storage medium, an electronic data storage medium, and a holographic data storage medium.

11. A method to inventory portable data cartridges disposed in a storage library, comprising the steps of:
    providing a storage library comprising a robotic accessor moveably disposed therein, a plurality of data storage cartridges, and at least one storage slot dimensioned to accommodate (N) portable data storage cartridges therein, wherein (N) is greater than or equal to 2;

wherein said robotic accessor comprises a lifting servo section and a bar code reader disposed on said lifting servo section wherein each of said plurality of data storage cartridges comprises a housing, a length, a data storage medium disposed within said housing; a first label reciting an identifier disposed on a front portion of said housing, and a second label disposed on a side portion of said housing, wherein said second label displays said identifier;

wherein said storage slot comprises a bottom, a side attached to said bottom and extending upwardly therefrom, an open end, (N−1) reflective members each comprising a first end attached to said side of said storage slot and an opposing second end extending outwardly therefrom, wherein said side is formed to include (N−1) apertures extending therethrough;

receiving a command to inventory the portable data storage cartridges disposed in said storage slot;

positioning said robotic accessor and said lifting servo section, such that said bar code reader can read (N−1) bar code identifier images, wherein each of said (N−1) bar code identifier image is projected through a different one of said (N−1) visualization apertures, and wherein each of said (N−1) bar code image is reflected by a different one of said (N−1) reflective members.

12. The method of claim 11, further comprising the step of positioning said robotic accessor and said lifting servo section, such that said bar code reader can read a bar code identifier displayed on a front portion of a portable data storage cartridge visible through said open end.

13. The method of claim 12, further comprising the step communicating (N) bar code identifiers to a storage controller disposed in said storage library.

14. The method of claim 13, further comprising the step of communicating said (N) bar code identifiers to a host computer in communication with said storage controller.

15. The method of claim 11, wherein said data storage medium is selected from the group consisting of a magnetic data storage medium, an optical data storage medium, an electronic data storage medium, and a holographic data storage medium.

16. The method of claim 11, wherein a second label disposed on each portable data storage cartridge displays an identifier unique to that portable data storage cartridge at (N−1) different locations.

17. The method of claim 16, wherein a (k+1)th display of said identifier on said label is disposed above a (k)th display of said identifier on said label, wherein (k) is greater than or equal to 1 and less than or equal to (N−2).

18. The method of claim 16, wherein:

a first end of a (k)th reflective member is a attached to a (k)th portion of said first side of said storage slot;

the first end of an (k+1)th reflective member is attached to an (k+1)th portion of said first side of said storage slot, wherein said (k+1)th portion of said first side is disposed above said (k)th portion of said first side.

\* \* \* \* \*